A. C. SPRINGER.
COCKS AND FAUCETS.
No. 179,492. Patented July 4, 1876.
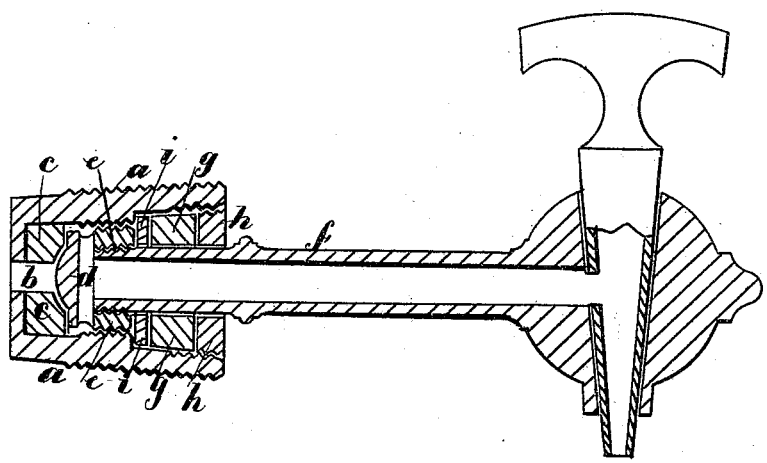
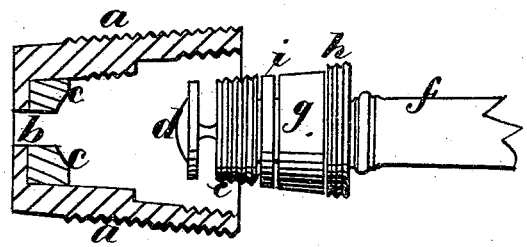

UNITED STATES PATENT OFFICE.

AMOS C. SPRINGER, OF SAN FRANCISCO, CALIFORNIA.

IMPROVEMENT IN COCKS AND FAUCETS.

Specification forming part of Letters Patent No. 179,492, dated July 4, 1876; application filed June 2, 1876.

*To all whom it may concern:*

Be it known that I, AMOS C. SPRINGER, of San Francisco city and county, State of California, have invented an Improved Tap for Faucets; and I do hereby declare the following description and accompanying drawings are sufficient to enable any person skilled in the art or science to which it most nearly appertains to make and use my said invention without further invention or experiment.

My invention relates to a novel construction of a tap for barrels and other containing-vessels; and it consists of a socket, which is screwed into the barrel permanently, and has a screw-valve, which can only be opened by the faucet, after the latter reaches its seat; and this valve must always be closed before the faucet can be removed, thus preventing all opportunity for leakage.

Referring to the accompanying drawings for a more complete explanation of my invention, Figs. 1 and 2 are longitudinal sections of my faucet.

$a$ is a socket, having screw-threads upon the outside; and this socket is screwed firmly and permanently into the barrel or other containing-vessel. A hole, $b$, smaller than the interior of the socket, communicates with the interior of the barrel, and an elastic seat, $c$, is fitted around this hole to receive the valve $d$. This valve is secured to a hollow socket, $e$, which has screw-threads upon the outside to fit it to the interior of the socket $a$, in which it is moved, and other threads upon the interior to receive the end of the faucet $f$. The valve is secured to this socket in such a manner as to have a slot around its edge; and, as the valve is smaller in diameter than the socket, it will be seen that when it is opened by screwing the socket outward, the liquid contained in the vessel will pass around the outside of the valve, and thence through the slots into the interior of the socket $e$. The socket $a$ is made somewhat larger above the point where the smaller socket $e$ is fitted, and a piece of any elastic substance, as rubber or cork $g$, is fitted into this enlarged part of $a$. A hole is made through this packing $g$, and the straight part of the faucet $f$ is pushed through the packing until it reaches the small socket $e$. The thread upon the outside of this socket is a right-hand screw, while that upon the faucet and the inside of the socket is a left-hand screw.

The operation will then be as follows: The valve $d$ is forced tight against its seat $c$ by the socket $e$ having been turned into its place, and will remain so until it is necessary to draw the contents from the cask. The faucet $f$ will then be pushed through the packing until it reaches the socket $e$, when it will be turned to the left until it has been screwed tight into the socket $e$. A further turn upon the faucet will loosen the socket $e$ and cause it to turn outward by means of its right-hand screw. This action draws the valve $d$ away from its seat $c$ and allows a free communication between the interior of the vessel and the faucet.

The flow is controlled by the usual key or spigot.

Whenever it is desired to close the valve, the faucet is turned in the opposite direction; and this turns the socket $e$ and valve $d$ back until the valve is seated. The faucet is then loosened and removed by turning it still more.

A washer, $i$, lies between the packing and the movable socket $e$ and prevents any wear. A cap, $h$, is screwed into the outer end of the socket $a$, having a hole just large enough to receive the faucet; and this cap protects the packing.

Having thus described my invention, what I claim as new, and desire to secure by Letters Patent, is—

1. The outer socket $a$, with its seat $c$, in combination with the valve $d$, attached to the interior socket $e$, as shown, said socket having the right and left screws, and constructed to be operated by the faucet $f$, substantially as herein described.

2. In combination with the socket $a$, having the valve $d$, secured to and operated by the interior socket $e$, and the faucet $f$, as shown, the packing-disk $g$, for making a tight joint around the faucet, with the cap $h$, substantially as herein described.

In witness whereof I hereunto set my hand and seal.

AMOS C. SPRINGER. [L. S.]

In presence of—
 GEO. H. STRONG,
 CHAS. G. PAGE.